United States Patent
Kumar et al.

(10) Patent No.: US 10,607,093 B2
(45) Date of Patent: Mar. 31, 2020

(54) OBJECT DETECTION SYSTEM AND METHOD THEREOF

(71) Applicant: Robert Bosch GmbH, Stuttgart (DE)

(72) Inventors: Naman Kumar, Pittsburgh, PA (US); James Stephen Miller, Dexter, MI (US); Matthew Baran, Northville, MI (US); Rajen Bhatt, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 15/776,387

(22) PCT Filed: Nov. 21, 2016

(86) PCT No.: PCT/EP2016/078291
§ 371 (c)(1),
(2) Date: May 15, 2018

(87) PCT Pub. No.: WO2017/089294
PCT Pub. Date: Jun. 1, 2017

(65) Prior Publication Data
US 2018/0330176 A1 Nov. 15, 2018

Related U.S. Application Data

(60) Provisional application No. 62/258,942, filed on Nov. 23, 2015.

(51) Int. Cl.
*G06T 7/00* (2017.01)
*G06K 9/00* (2006.01)
(Continued)

(52) U.S. Cl.
CPC ......... *G06K 9/00805* (2013.01); *B60R 21/38* (2013.01); *G06K 9/3233* (2013.01); *G06T 7/90* (2017.01); *G06T 2210/12* (2013.01)

(58) Field of Classification Search
CPC ............ G06K 9/00; G06T 7/00; G08B 13/12
(Continued)

(56) References Cited

U.S. PATENT DOCUMENTS 7,359,782 B2 * 4/2008 Breed ................. B60R 21/0134
701/45
10,423,164 B2 * 9/2019 Baran ..................... G01C 11/04
(Continued)

OTHER PUBLICATIONS

Felzenszwalb, Pedro F. et al., "Object Detection with Discriminatively Trained Part-Based Models", IEEE Transactions on Pattern Analysis and Machine Intelligence, vol. 32, No. 9, Sep. 2010, pp. 1627-1645.
(Continued)

*Primary Examiner* — Abolfazl Tabatabai
(74) *Attorney, Agent, or Firm* — Maginot, Moore & Beck LLP

(57) ABSTRACT

An object detection system for used in a vehicle includes an object detector is provided. One or more fisheye lens cameras coupled to an object detection system are positioned at various location of the vehicle for capturing a field of view (FOV) into an image. The image is split into multiple different set of perspective images. Each perspective images may include a portion of overlap having common or identical object of interest. The object detector classifies various objects of interest in the perspective images, estimates distance of objects of interest from the vehicle using camera calibration information stored in one of the camera, and transmits the sensed information that corresponds to the distance of interest to a processor. The processor includes sequence of instruction or object code either located in one of the object detection system, in-vehicle network, and an electronic device processes the sensed information and applies bounding boxes around objects of interest the vehicle or in the electronic device. One or more images
(Continued)

incorporated the colored bounding boxes are transmitted to a display unit or screen for display as human readable format.

19 Claims, 4 Drawing Sheets

(51) Int. Cl.
    *B60R 21/38*     (2011.01)
    *G06T 7/90*     (2017.01)
    *G06K 9/32*     (2006.01)
    *G06F 3/00*     (2006.01)

(58) Field of Classification Search
    USPC ......................................................... 382/103
    See application file for complete search history.

(56) References Cited

U.S. PATENT DOCUMENTS

2012/0249726 A1     10/2012     Corcoran et al.
2014/0193034 A1     7/2014     Oami et al.

OTHER PUBLICATIONS

Dalal, Navneet et al., "Histograms of Oriented Gradients for Human Detection", 2005 IEEE Computer Society Conference on Computer Vision and Pattern Recognition (CVPR'05).
Viola, Paul et al., "Detecting Pedestrians Using Patterns of Motion and Appearance", 2003 Proceedings of the Ninth IEEE International Conference on Computer Vision (ICCV'03).
Dollar, Piotr et al., "The Fastest Pedestria Detector in the West", British Machine Vision Conference, 2010, pp. 1-11.
Papageorgiou, Constantine et al., "A trainable System for Object Detection", 2000 IEEE International Journal of Computer Vision (38(1), pp. 15-33.
Lourenco, Miguel et al., "sRD-SIFT: Keypoint Detectin and Matching in Images With Radian Distortion", IEEE Transactions on Robotics, vol. 28, No. 3, Jun. 2012, pp. 752-760.
Yuan, Xue et al., "Automatic surveillance system using fish-eye lens camera", Chinese Optics Letters, vol. 9, No. 2, Feb. 10, 2011, pp. 021101-1-021101-5.
Yu, Hongfei et al., "Moving Object Detection Using an In-Vehicle Fish-eye Camera", 2010 6th International Conference on Wireless Communications Networking and Mobile Computing (WiCOM), pp. 1-6.
Alvarez, S. et al., "Vehicle and Pedestrian Detection in eSafety Applications", Proceedings of the World Congress on Engineering and Computer Science 2009, vol. II, pp. 1-6.

\* cited by examiner

OBJECT DETECTION SYSTEM AND METHOD THEREOF

This application is a 35 U.S.C. § 371 National Stage Application of PCT/EP2016/078291, filed on Nov. 21, 2016, which claims the benefit of priority to U.S. Provisional Patent Application No. 62/258,942, filed on Nov. 23, 2015, the disclosures of which are incorporated by reference herein in their entirety.

FIELD

The patent relates generally to an object detection system for used in a vehicle.

BACKGROUND

Unless otherwise indicated herein, the materials described in this section are not prior art to the claims in this application and are not admitted to the prior art by inclusion in this section.

Use of forward looking, side view, and rear view cameras are becoming a common feature in latest automotives. Uses of cameras for automotives have also accelerated the development of applications improving vehicle, driver, passenger, and pedestrian safety. Especially, lack of rear visibility technology contribute to high injuries/deaths. These injuries/deaths take place while reversing a car in parking lots, backing up a car from drive ways, and so forth. According to National Highway Traffic Safety Administration (NHTSA), about 210 fatalities and 15000 injuries per year are caused in back-over accidents in the U.S. alone. 31 percent of the incidents involve children under age 5. The U.S. Department of Transportation's National Highway Traffic Safety Administration (NHTSA) recently issued a final rule requiring rear visibility technology in all new vehicles under 10,000 pounds by May 2018.

There is an extensive studies available on object and people detections. The limitation of the conventional detectors is that it is not invariant to Radial distortion which is present inherently in the fisheye images and videos.

Fisheye camera images also have extremely wide field of view and image magnification decrease with distance from optical axis. This creates non-uniform sampling of pixels in the image. An example of a fisheye image 10 with radial distortion is shown in FIG. 1.

Due to these reasons, conventional detectors cannot be applied directly on the fisheye images. There has been some work done on modifying Scale-Invariant Feature Transform (SIFT) descriptors to make them invariant to Radial distortion, however, SIFT features are not suitable for object detection and there has been no effort to develop efficient object detectors for radial distorted fisheye images using SIFT descriptors. Therefore, there is a need to develop efficient techniques which can be used to detect and recognize objects using fisheye camera installed in automotive.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one aspect, a vehicle comprising a vehicle body having at least four sides, one or more of a fisheye lens cameras is mounted to the vehicle body, the fisheye lens cameras generates one or more of field of view (FOV) images, and an object detection system communicatively coupled to at least one or more of the fisheye lens cameras, the object detection system configured to classify object of interest appeared on one or more of the FOV images, estimate distance of object of interest either between the vehicle and the object of interest or between two or more of the object of interest, apply bounding boxes around the classified object of interest. A display unit is further provided and is communicatively coupled to the object detection system for displaying the FOV image in the form of at least one or more of a narrow FOV, a wide FOV, an ultra-wide FOV, and an ultra-narrow FOV. The object of interest comprising pedestrians, vehicles, traffic lights, and signages. A processor is further communicatively coupled to one of the object detection system or the fisheye lens cameras. The processor comprises a sequence of instruction or object code and is configured to process the FOV images incorporating applied bounding boxes around the classified object of interest and transmit the FOV images to the display unit for display in a human readable format. The processor is also configured to control the vehicle of an event detected by the object detector A transducer mounted on the vehicle is provided and connected to the processor. The transducer is triggered to generate sound-based warning of an event. The bounding boxes comprises at least one or more color coding to distinguish the classified object of interest. One or more FOV images having one or more object of interest are partially or wholly overlap to each other.

In another aspect, an object detection system for used in a vehicle includes an object detector is provided. One or more fisheye lens cameras coupled to an object detection system are positioned at various location of the vehicle for capturing a field of view (FOV) into an image. The image is split into multiple different set of perspective images. Each perspective images may include a portion of overlap having common or identical object of interest. The object detector classifies various objects of interest in the perspective images, estimates distance of objects of interest from the vehicle using camera calibration information stored in one of the camera, and transmits the sensed information that corresponds to the distance of interest to a processor. The processor includes sequence of instruction or object code either located in one of the object detection system, in-vehicle network, and an electronic device processes the sensed information and applies bounding boxes around objects of interest the vehicle or in the electronic device. One or more images incorporated the colored bounding boxes are transmitted to a display unit or screen for display as human readable format.

In yet another aspect, An object detection system for a vehicle comprises a fisheye lens cameras generates a field of view image (FOV) and an object detector coupled to the fisheye lens cameras, the object detector is configured to classify object of interest appeared on one or more of the FOV images, estimate distance of object of interest either between the vehicle and the object of interest or between two or more of the object of interest, apply bounding boxes around the classified object of interest. The field of view image is at least one or more of a narrow FOV, a wide FOV, an ultra-wide FOV, and an ultra-narrow FOV. A display unit communicatively coupled to the object detector for displaying the FOV image is provided. The display unit is at least one or more of a tablet, a desktop, a personal digital assistant (PDA), an entertainment unit, a monitor, a cellular phone, a hand-held computer, and a wearable device. In one embodiment, the object of interest comprises pedestrians, vehicles, traffic lights, and signages. A processor a sequence of instruction or object code is provided and is configured to process the FOV images incorporating applied bounding boxes around the classified object of interest and transmit the FOV images to the display unit for display in a human readable format. Further, the processor is configured to control the vehicle of an event detected by the object detector. A transducer mounted on the vehicle, the transducer connected to the processor is triggered to generate sound-based warning of an event. The bounding boxes comprises at least one or more color coding to distinguish the classified object of interest. One or more FOV images having one or more object of interest are partially or wholly overlap to each other.

BRIEF DESCRIPTION OF THE DRAWINGS

These and other features and aspects of this patent will become better understood when the following detailed description of certain exemplary embodiments is read with reference to the accompanying drawings in which like characters represent like arts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such development effort might be complex and time consuming, but would nevertheless be a routine undertaking of design, fabrication, and manufacture for those of ordinary skill having the benefit of this disclosure.

As used herein, the term "metadata" refers to properties of objects that are identified in video or other image data. For example, if an object is captured in a field of view (FOV) of a camera, the metadata corresponding to the object include the two dimensional position of the object in the frames of video or image data, velocity of the object, a direction of movement of the object, a size of the object, and a duration of time that the object is present in the FOV of the camera. As described below, events are identified with reference to be observed metadata of an object. The metadata do not require that an object be identified with particularity. In one embodiment, the metadata do not identify that an object is a particular person, or even a human being. Alternative embodiments, however, infer that metadata correspond to a human if the event is similar to an expected human action, such metadata of an object moving at a direction and speed that correspond to a human walking past a camera. Additionally, individual objects are only tracked for a short time and the metadata do not identify the same object over prolonged time periods. Thus, the stored metadata and identification of high-interest events due to metadata do not require the collection and storage of Personally Identifiable Information (PII) beyond storage of video or image data footage for later retrieval.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
FIG. 1 is an illustration of an exemplary fisheye image with radial distortion.
Figure 2:
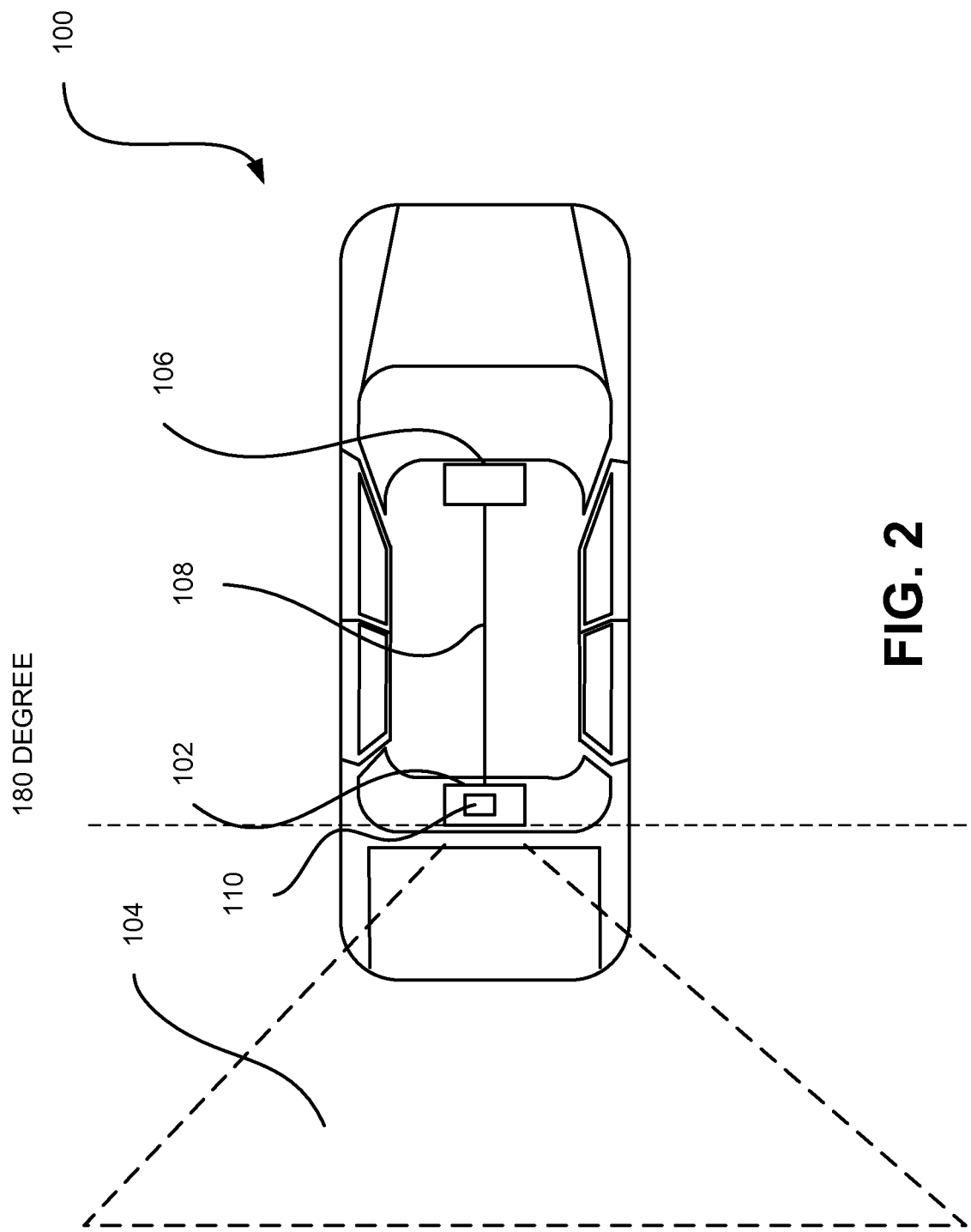
FIG. 2 is an illustration of a vehicle including an object detection system in accordance with a described embodiment.

With reference to FIG. 2, a vehicle 100 is depicted and comprises an object detection system 102 that views an area 104 at a rear of the vehicle 100. In one embodiment, the object detection system 102 comprises a camera 110 such as a fisheye lens camera and is capable of capturing a field of view (FOV) in a single video image. The video image captured by the camera includes a narrow FOV, a wide FOV, an ultra-wide FIV, an ultra-narrow FOV, or combination thereof Although the object detection system 102 is positioned at the rear of the vehicle 100, the system 102 may be positioned at any location of the vehicle 100. More than one camera 110 may be incorporated in the object detection system 102 for capturing other FOV to a left side, right side, or forward of the vehicle 100. In one embodiment, the camera 110 may be either communicatively coupled to the object detection system 102 via wired or wirelessly. More than one camera may be mounted to various locations of the vehicle 100, depending on the application. In another embodiment, the camera 110 and the object detection system 102 may be located in different portion of the vehicle 100. For example, the camera 100 is positioned at the rear of the vehicle 100 whereas the object detection system 102 is located inside the vehicle. The object detection system 102 is coupled to a display unit 106 located at a front of the vehicle 100 via a bus or in-vehicle network 108. The bus 108 may be CAN bus or the like. The image captured by the camera 110 is processed by the object detection system 102 before the processed image is displayed at the display unit 106 as a human readable format. In one embodiment, the processed image is transmitted to an electronic device for display as a human readable format. The electronic device may be for example a mobile phone, a computer monitor, a laptop, a tablet, a personal digital assistant (PDA), a hand-held computer, a wearable device, and the like.

Going back to the images captured by the fisheye camera 100, each of the fisheye image can be either split or transform into at least two perspective images, but can be more or less than two perspective images, depending on the application.

Figure 3:
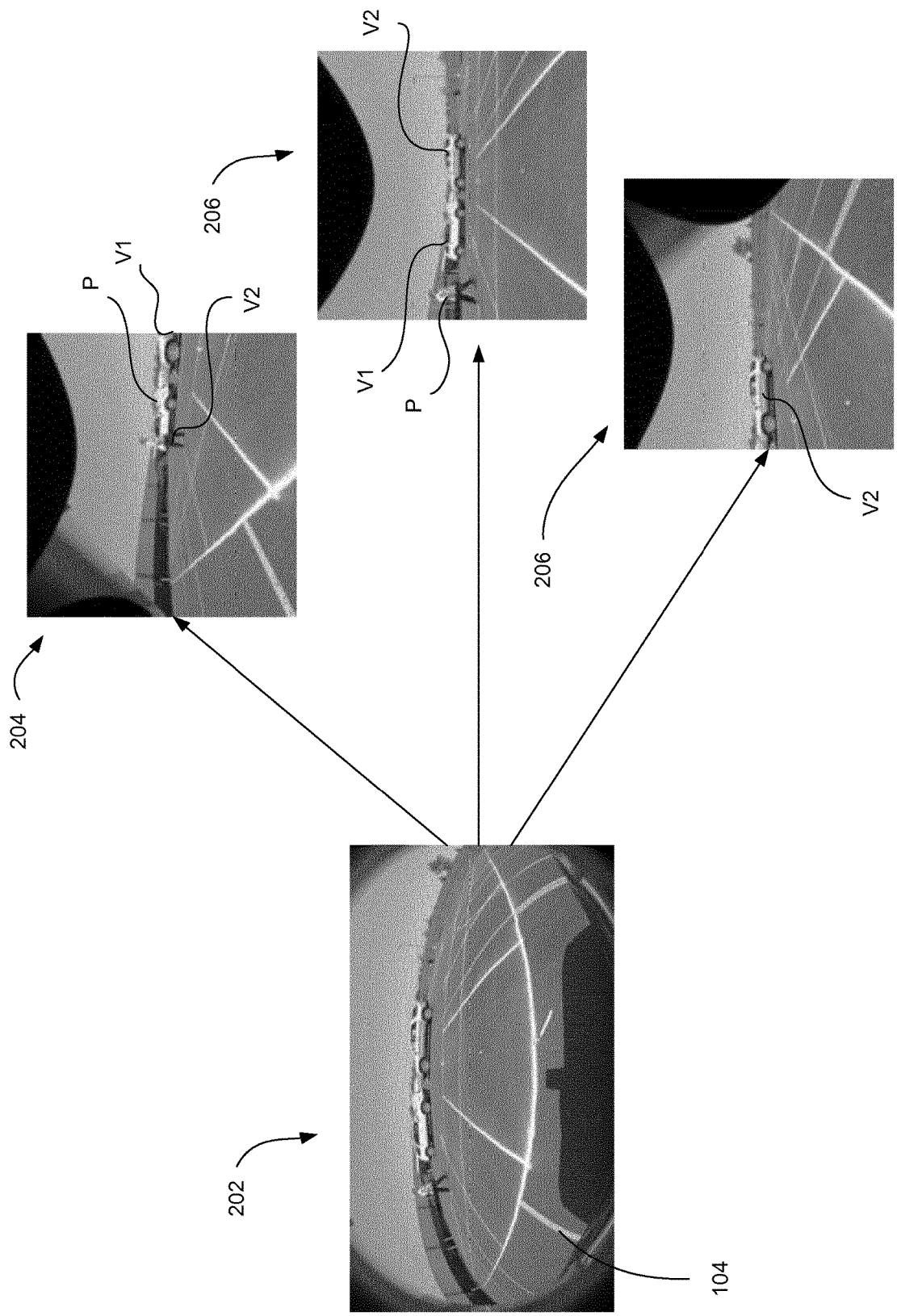
FIG. 3 is an illustration of a fisheye image split into multiple images using a splitter in accordance with a described embodiment.

Now referring to FIG. 3, a fisheye image 202 of an area 104 is captured by the camera 110 of FIG. 2. The fisheye image 202 is split into three different set of fisheye or perspective images. As illustrated, left, center, and right perspective images 204, 206, 208 are transmitted to at least one object detector 102 of FIG. 2 for processing. Although more than one object detector 102 may be provided to process the perspective images 204, 206, 208 independently. The perspective images 204, 206, 208 may include a portion of overlap having common or identical objects of interest. For example, perspective image 204 includes a person or pedestrian P and two vehicles V1, V2. Perspective image 206, on the other hand, includes the same person P and vehicle V1, V2. Perspective image 208, however, includes only vehicle V2. The common or identical objects of interest found on these images 204, 206, 208 is vehicle V2. Each of the object detector 102 classifies various objects of interest such as P, V1, V2 in the split images 204, 206, 208. The objects of interest may be for example pedestrians, vehicles, bikes, shopping carts, and so forth. Based on the multiple common or identical overlaps found on the perspective images 204, 206, 208, the object detector 102 corresponds to each perspective image therefore achieve better accuracy of classifying the objects of interest. Once the objects of interest is identified and classified, the object detector 102 continues to perform other functions. In one embodiment, the object detector 102 is capable of estimate distance of objects of interest from the vehicle using camera calibration information stored in one of the camera, object detector, memory, database, a processor, or the like. The object detector 102 then applies bounding boxes around objects of interest illustrated in the perspective images 204, 206, 208 in different colors depending on the distance of objects from the vehicle. Alternatively, the object detector 102 transmits the sensed information that corresponds to the distance of interest to the processor and in turn, the processor includes sequence of instruction or object code and processes the sensed information and applies bounding boxes around objects of interest illustrated in the perspective images 204, 206, 208 in different colors depending on the distance of objects from the vehicle. The processor for performing the above described processes may be either integrated in the vehicle or in the electronic device. In one embodiment, the object of interest located a distance further from the vehicle is drawn with a green color bounded box while the object of interest located a distance close to the vehicle is drawn with a color different from green bounded box. One or more images incorporated the colored bounding boxes are transmitted to a display unit or screen for display as human readable format. In one embodiment, the display unit or screen may be integrated in the vehicle. In other embodiment, the display unit or screen is part of the electronic device.

The object detector 102 transmits the classified information corresponds to the object of interest to the processor via a bus or in-vehicle network 108. The processor includes an instruction of object code for controlling a transducer (not shown) to generate sound-based warning to the vehicle driver of an event. The sound-based warning is triggered only when the object of interest is located a predefined distance closer to the vehicle. Alternatively, the sound-based warning is triggered when the predefined distance is below a threshold. The processor may perform other controls. For example, the processor controls the brake of the vehicle for emergency stop or brake if objects of interest too close to the vehicle are detected. In yet another embodiment, the processor controls the speed of the vehicle if objects of interest too close to the vehicle are detected.

Figure 4:
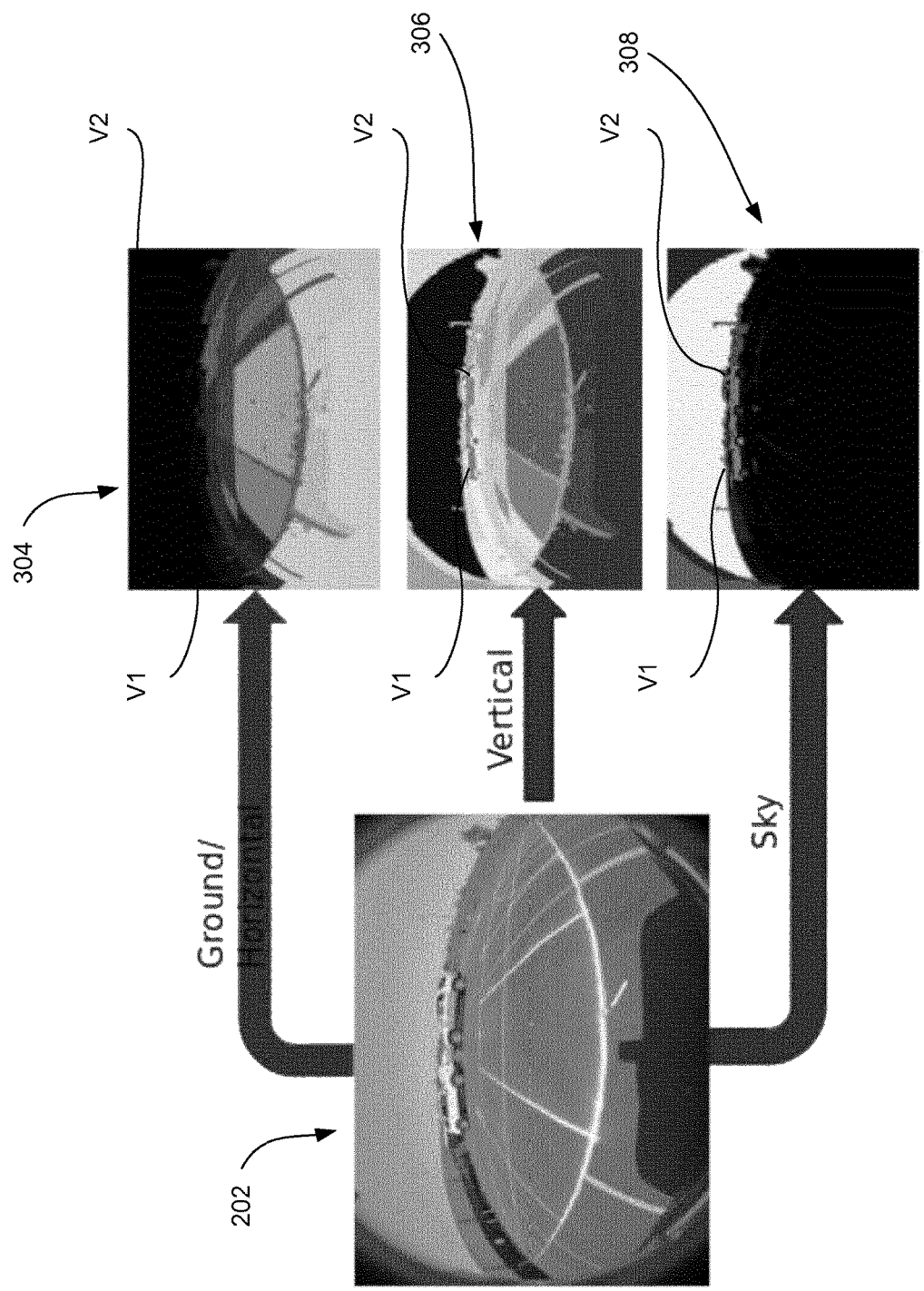
FIG. 4 is an illustration of a fisheye image split into multiple images using a splitter in accordance with another described embodiment.

FIG. 4 illustrate a fisheye image 202 of an area 104 captured by the camera 110 of FIG. 2. As can be seen, the fisheye image 202 is identical to the fisheye image 202 illustrated in FIG. 3. The fisheye image 202 is split into various views. The views include a ground plain view 304, a vertical plain view 306, and a sky estimation view 308. A device such as an object detector 102 of FIG. 2 is provided for calibrating parameter and view point information. As mentioned earlier, the object detector 102 communicatively coupled to the fisheye camera 104. In one embodiment, the calibration parameter and view point information includes height of camera from ground plane, position of camera on the rear side of vehicle, and so forth. The object detector 102 scans or detects objects of interest within a predefined threshold and any objects outside the threshold will not be processed. For example, a drone depicted in the sky estimation view 308 that falls outside the threshold will not be scanned or detected by the object detector thus eliminates the processing time of computation non-objects of interest. Only objects of interest falls within the threshold will be scanned and detected. For example, all the three views 304, 306, and 308 depict vehicles V1 and V2. One or more object detectors scan and detect possible objects of interest, in this case V1 and V2, and discard other objects outside the threshold. In one embodiment, the object detector is capable of estimating one or more regions where V1 and V2 are detected in the vertical plain view 306. In another embodiment, the object detector is capable of detecting possible objects such as V1 and V2 from the ground plane in the ground plain view 304. The object detector for use to detect the objects of interest in the vertical plain view 306 may be a different object detector for use to detect the objects of interest in the ground plain view 304. The information detected by one or more object detectors are collected and combined together for processing.

The object detector 102 is also capable of estimate distance of objects from vehicle using camera calibration information based on the sensed information described above and applies bounding boxes around objects illustrated in the perspective images 304, 306, 308 in different colors depending on the distance of objects from the vehicles. In one embodiment, the object of interest located a distance further from the vehicle is drawn with a green color bounded box while the object of interest located a distance closer to the vehicle is drawn with a color different from green bounded box. The object detector 102 transmits the classified information corresponds to the object of interest to a processor (not shown) via a bus or in-vehicle network 108. The processor includes an instruction of object code for execution control a transducer (not shown) to generate early sound-based warning to the vehicle driver. The sound-based warning is triggered only when the object of interest is located a distance closer to the vehicle. In another embodiment, the processor controls the brake of the vehicle for emergency stop or brake if objects of interest too close to the vehicle are detected. In yet embodiment, the processor may control the speed of the vehicle if objects of interest too close to the vehicle are detected.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

It is believed that the patent and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A vehicle comprising:
   a vehicle body having at least four sides;
   one or more of a fisheye lens cameras is mounted to the vehicle body, the fisheye lens cameras generates one or more of field of view (FOV) images; and
   an object detection system communicatively coupled to at least one or more of the fisheye lens cameras, the object detection system configured to classify object of interest appeared on one or more of the FOV images, estimate distance of object of interest either between the vehicle and the object of interest or between two or more of the object of interest, apply bounding boxes around the classified object of interest.

2. The vehicle of claim 1, further comprising a display unit communicatively coupled to the object detection system for displaying the FOV image.

3. The vehicle of claim 2, wherein the field of view image is at least one or more of a narrow FOV, a wide FOV, an ultra-wide FOV, and an ultra-narrow FOV.

4. The vehicle of claim 2, further comprising a processor communicatively coupled to one of the object detection system or the fisheye lens cameras, the processor comprises a sequence of instruction or object code and is configured to process the FOV images incorporating applied bounding boxes around the classified object of interest and transmit the FOV images to the display unit for display in a human readable format.

5. The vehicle of claim 4, further comprising a transducer mounted on the vehicle, the transducer connected to the processor is triggered to generate sound-based warning of an event.

6. The vehicle of claim 4, wherein the processor is configured to control the vehicle of an event detected by the object detector.

7. The vehicle of claim 4, wherein one or more FOV images having one or more object of interest are partially or wholly overlap to each other.

8. The vehicle of claim 1, wherein the object of interest comprising pedestrians, vehicles, traffic lights, and signages.

9. The vehicle of claim 1, wherein the bounding boxes comprises at least one or more color coding to distinguish the classified object of interest.

10. An object detection system for a vehicle comprising:
    a fisheye lens cameras generates a field of view image (FOV); and
    an object detector coupled to the fisheye lens cameras, the object detector is configured to classify object of interest appeared on one or more of the FOV images, estimate distance of object of interest either between the vehicle and the object of interest or between two or more of the object of interest, apply bounding boxes around the classified object of interest.

11. The object detection system of claim 10, wherein the field of view image is at least one or more of a narrow FOV, a wide FOV, an ultra-wide FOV, and an ultra-narrow FOV.

12. The object detection system of claim 10, further comprising a display unit communicatively coupled to the object detector for displaying the FOV image.

13. The object detection system of claim 12, wherein the display unit is at least one or more of a tablet, a desktop, a personal digital assistant (PDA), an entertainment unit, a monitor, a cellular phone, a hand-held computer, and a wearable device.

14. The object detection system of claim 12, further comprising a processor, the processor comprises a sequence of instruction or object code and is configured to process the FOV images incorporating applied bounding boxes around the classified object of interest and transmit the FOV images to the display unit for display in a human readable format.

15. The object detection system of claim 14, further comprising a transducer mounted on the vehicle, the transducer connected to the processor is triggered to generate sound-based warning of an event.

16. The object detection system of claim 14, wherein the processor is configured to control the vehicle of an event detected by the object detector.

17. The object detection system of claim 10, wherein the object of interest comprising pedestrians, vehicles, traffic lights, and signages.

18. The object detection system of claim 10, wherein the bounding boxes comprises at least one or more color coding to distinguish the classified object of interest.

19. The object detection system of claim 10, wherein one or more FOV images having one or more object of interest are partially or wholly overlap to each other.

* * * * *